United States Patent
Todorovic

(10) Patent No.: US 8,479,877 B2
(45) Date of Patent: Jul. 9, 2013

(54) GAS-TURBINE EXHAUST CONE WITH THREE-DIMENSIONALLY PROFILED PARTITION WALL AND PLATE-TYPE WALL ELEMENT

(75) Inventor: Predrag Todorovic, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 0 days.

(21) Appl. No.: 13/555,790

(22) Filed: Jul. 23, 2012

(65) Prior Publication Data

US 2013/0025962 A1    Jan. 31, 2013

(30) Foreign Application Priority Data

Jul. 26, 2011 (DE) .......................... 10 2011 108 533

(51) Int. Cl.
    *F02K 1/00* (2006.01)
(52) U.S. Cl.
    USPC .......................................... 181/213; 244/1 N
(58) Field of Classification Search
    USPC .......................................... 181/213; 244/1 N
    See application file for complete search history.

(56) References Cited

U.S. PATENT DOCUMENTS

| | | | | |
|---|---|---|---|---|
| 3,948,346 | A * | 4/1976 | Schindler | 181/286 |
| 4,064,961 | A | 12/1977 | Tseo | |
| 4,137,992 | A | 2/1979 | Herman | |
| 6,209,679 | B1 * | 4/2001 | Hogeboom et al. | 181/286 |
| 6,615,576 | B2 * | 9/2003 | Sheoran et al. | 60/39.5 |
| 6,935,834 | B2 * | 8/2005 | Lata Perez | 415/115 |
| 6,966,402 | B2 * | 11/2005 | Matias et al. | 181/290 |
| 6,973,790 | B2 * | 12/2005 | Suenaga et al. | 60/725 |
| 7,267,297 | B2 * | 9/2007 | Campbell et al. | 244/1 N |
| 7,784,283 | B2 | 8/2010 | Yu et al. | |
| 8,025,122 | B2 * | 9/2011 | Gilcreest et al. | 181/213 |
| 8,037,967 | B2 | 10/2011 | Mercat | |
| 2008/0017442 | A1 * | 1/2008 | Douglas | 181/213 |

FOREIGN PATENT DOCUMENTS

| | | |
|---|---|---|
| FR | 2396868 | 2/1979 |
| WO | 2004/108405 | 12/2004 |
| WO | 2008/095846 | 8/2008 |

OTHER PUBLICATIONS

German Search Report dated May 7, 2012 from counterpart application.

* cited by examiner

*Primary Examiner* — Forrest M Phillips
(74) *Attorney, Agent, or Firm* — Timothy J. Klima; Shuttleworth & Ingersoll, PLC

(57) ABSTRACT

A gas-turbine exhaust cone has an outer wall with a plurality of recesses, a honeycomb-structured layer arranged at the inside of the outer wall and extending along said inside of the outer wall, an inner wall connected to the honeycomb structure and extending essentially parallel to the outer wall, and at least one annular chamber centered on a central axis and adjoining the inner wall. The inner wall has passage recesses connecting the area of the honeycomb structure to the annular chamber, with the annular chamber being subdivided in the circumferential direction by at least one partition wall into several chambers. The partition wall is made from a sheet-metal-like material and has a plurality of raised and/or recessed areas in a uniform arrangement formed by shaping of the sheetmetal-like material.

16 Claims, 6 Drawing Sheets

Figure 1:
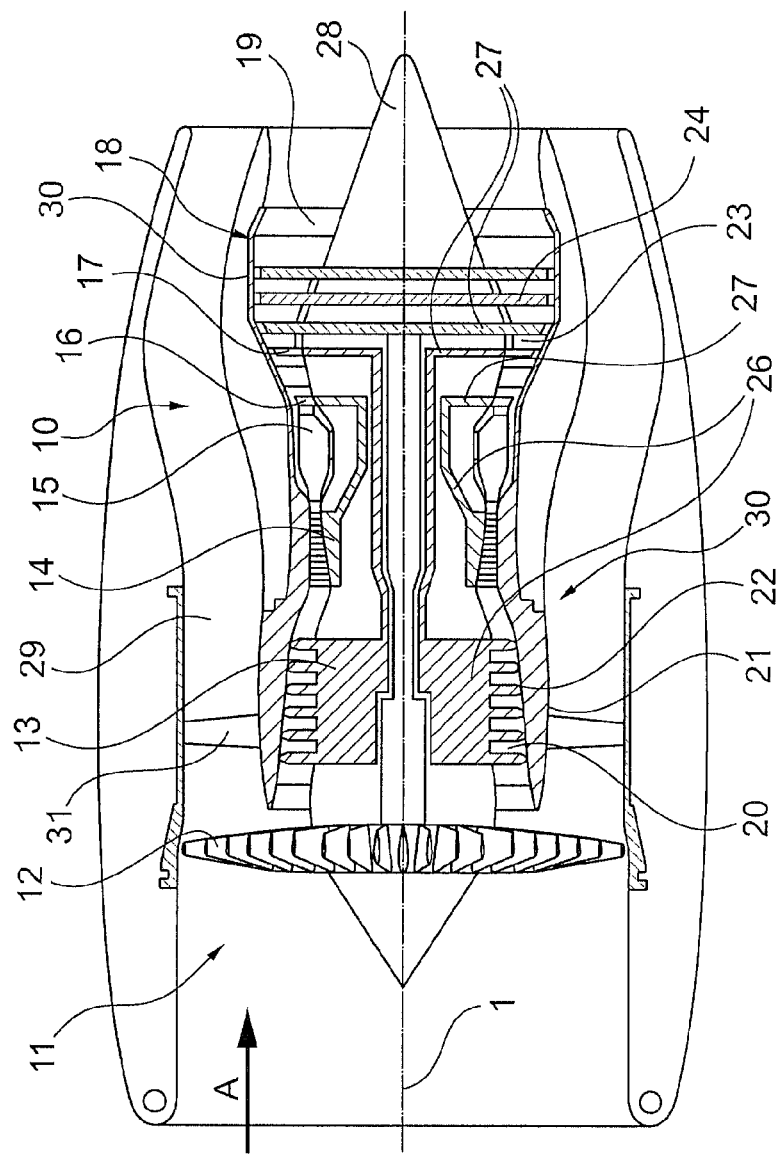

GAS-TURBINE EXHAUST CONE WITH THREE-DIMENSIONALLY PROFILED PARTITION WALL AND PLATE-TYPE WALL ELEMENT

This application claims priority to German Patent Application DE102011108533.9 filed Jul. 26, 2011, the entirety of which is incorporated by reference herein.

This invention relates to a gas-turbine exhaust cone arranged at the outflow area of a gas turbine.

Gas turbines for aircraft engines require noise abatement. For this, various measures are known to minimize the noise of the gas stream exiting from an exhaust nozzle downstream of the turbine.

From the state of the art it is known to dampen the low frequencies occurring in particular on engines with lean combustion. Noise dampening is here accomplished by means of a Helmholtz resonator. It is known to provide such a Helmholtz resonator in the inflow area of the exhaust cone, while the downstream end area of the exhaust cone is merely conceived as geometric body. Known Helmholtz resonators are here provided as a system of radial walls and inner cylindrical ducts and dimensioned in dependence of the frequencies.

The known designs disadvantageously require reinforcing elements as they are heavily mechanically loaded in terms of the gas temperatures occurring. Also attributable to different walls and stiffening elements, the resultant design features a relatively high weight. Additionally, manufacture thereof requires high effort and investment. Manufacturing costs are still further increased by internal acoustic measures (perforations or similar). Further, the axial length of such a resonator requires considerable installation space, adding to the weight of the arrangement. Furthermore there is no noise sealing between the individual cavities.

In addition to the problems known from the state of the art, it has proved desirable in the case of gas turbines to sufficiently dampen the lower-frequency vibrations of the combustion chamber, in addition to the higher vibrations of the turbine. To do so, deep and large chambers are required, which are subdivided by axi-radial partition walls. The outer and perforated walls of a gas-turbine exhaust cone are subjected to very high gas temperatures, while the partition walls or structures installed in the interior of the exhaust cone have much lower temperatures. This results in the question of thermal expansions or contractions. These lead to important movements of the border areas between the individual structural elements, resulting in a not inconsiderable risk of cracking and component failure.

A differing thermal expansion or contraction of the partition walls and of the components affected leads to a non-linear and non-identical expansion and/or contraction of the partition walls (axi-radial walls). The consequence of this are distortions and deformations of the walls due to the shear forces introduced. The very high temperature differences mean that the relative differential expansion or contraction is very high, leading to plastic deformations of the walls and to an overall failure of the structure. Reinforcement of the axi-radial walls does not solve this problem, since reinforcements lead to further movement problems and in turn to cracks, fractures or failure of the welds on the circumferential structure (inner walls and outer walls of the exhaust cone).

In a broad aspect, the present invention provides a gas-turbine exhaust cone of the type specified at the beginning which, while avoiding the disadvantages of the state of the art, allows high thermal expansions or contractions.

It is a particular object of the present invention to provide solution to the above problematics by a combination of the features of the main Claim. Further advantageous embodiments of the present invention become apparent from the sub-claims.

A gas-turbine exhaust cone is thus provided in accordance with the invention that has an outer wall with a plurality of recesses, with an inner wall extending along the inside of the outer wall. A honeycomb-structured layer is arranged between the outer wall and the inner wall. The sound pressure waves can penetrate into the interior of the exhaust cone through suitable recesses. For damping of the low-frequency vibrations in particular, one or more annular chambers centered on a central axis are provided adjoining the inner wall and are subdivided in the circumferential direction into individual chambers. It is provided here in accordance with the invention that the subdivision of the respective annular chamber into individual chambers arranged in the circumferential direction is achieved by at least one partition wall made from a sheetmetal-like material. The partition wall includes a plurality of raised and/or recessed areas in a uniform arrangement formed by shaping of the sheetmetal-like material and providing a three-dimensional wave-like structure. The result is thus an elliptical/paraboloid structure similar to an eggbox-like arrangement where the raised and recessed areas can each be disposed in lines parallel to one another. It is however also possible to offset the individual lines relative to one another such that a very dense packing similar to a honeycomb structure is obtained.

Due to the raised and recessed areas provided in accordance with the invention and forming a three-dimensional and regular structure or pattern, the partition wall is able to absorb major thermal expansions at individual areas of the partition wall. In this way, individual rim areas can thermally expand or contract in opposing directions without the overall structure being damaged as a result. This proves to be particularly advantageous at those rim areas where the partition wall is connected to further structural elements, since there is no risk there of cracking due to overload. Instead, the three-dimensional partition wall itself deforms, such that forces caused by thermal effects are not transmitted to adjacent structural elements. The partition wall thus has a reduced stiffness and hence has the possibility of transmitting shear forces. The result is a controlled reduction of local stability which does not however impair the functioning and the overall stability of the partition wall. This permits different offsets of the axi-radial edges of the partition wall without introducing major shear forces.

The partition wall in accordance with the invention is preferably manufactured by a shaping process, for example by deep-drawing or superplastic deformation. It is furthermore possible in accordance with the invention to provide welded connections at selected areas of the edges of the partition wall, for example at the raised areas or at the recessed areas. This does not impair the deformability of the partition wall. It is also possible in accordance with the invention to connect the partition wall to the structural elements of the exhaust cone by means of soldering or another joining method. A solution is thus provided in accordance with the invention which avoids the drawbacks of the state of the art by using a simple structure of a partition wall characterized by low weight and cost-effective producibility.

In a favourable embodiment, the partition wall in accordance with the invention is designed such that it is wave-shaped or sawtooth-shaped or sinusoidal in section, or is formed by intersecting wave shapes. In any event, the result is an eggbox-like overall configuration which permits widely differing local expansions or contractions due to thermal effects and is at the same time soundproof.

Figure 2:
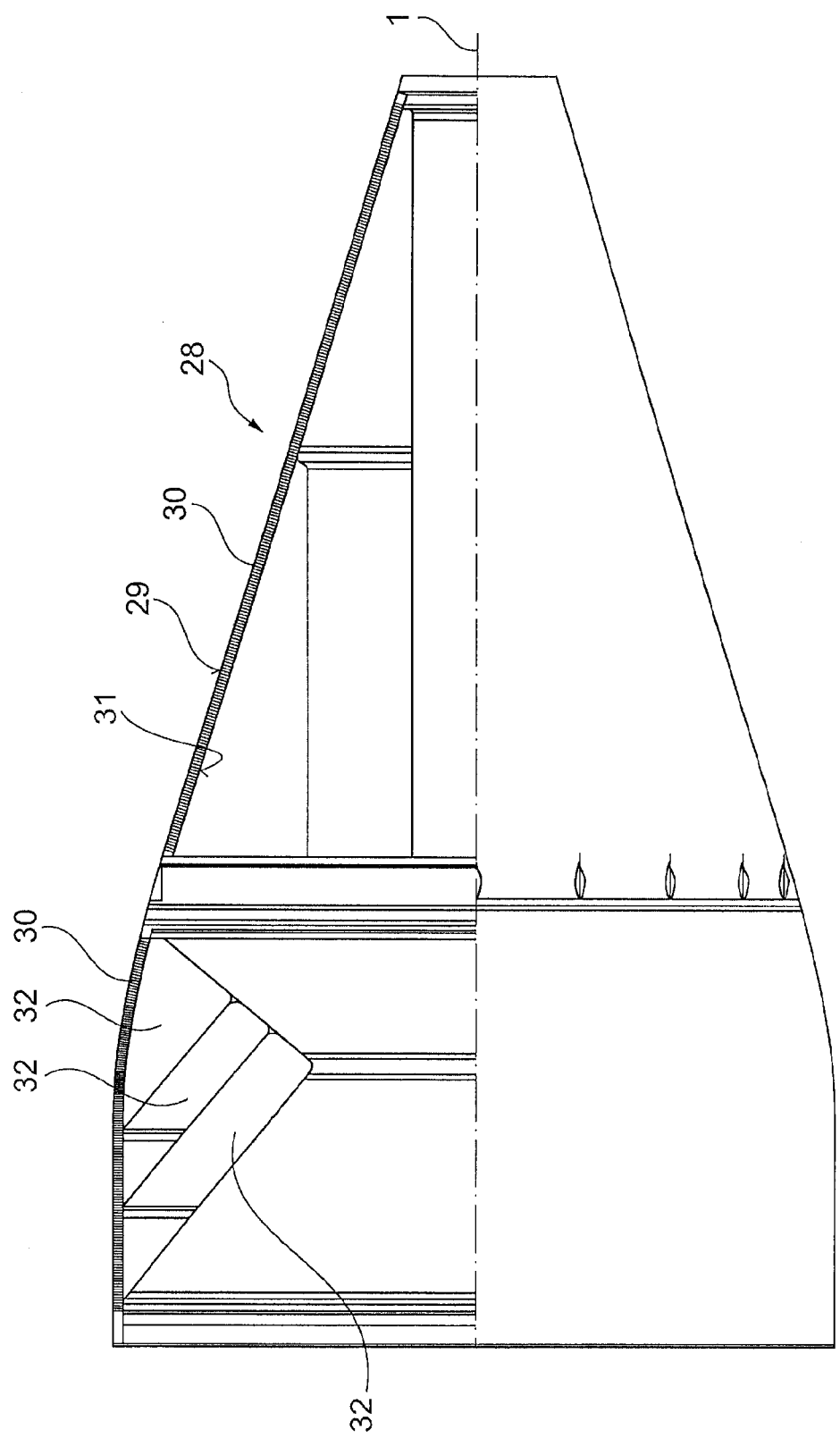
Figure 3:
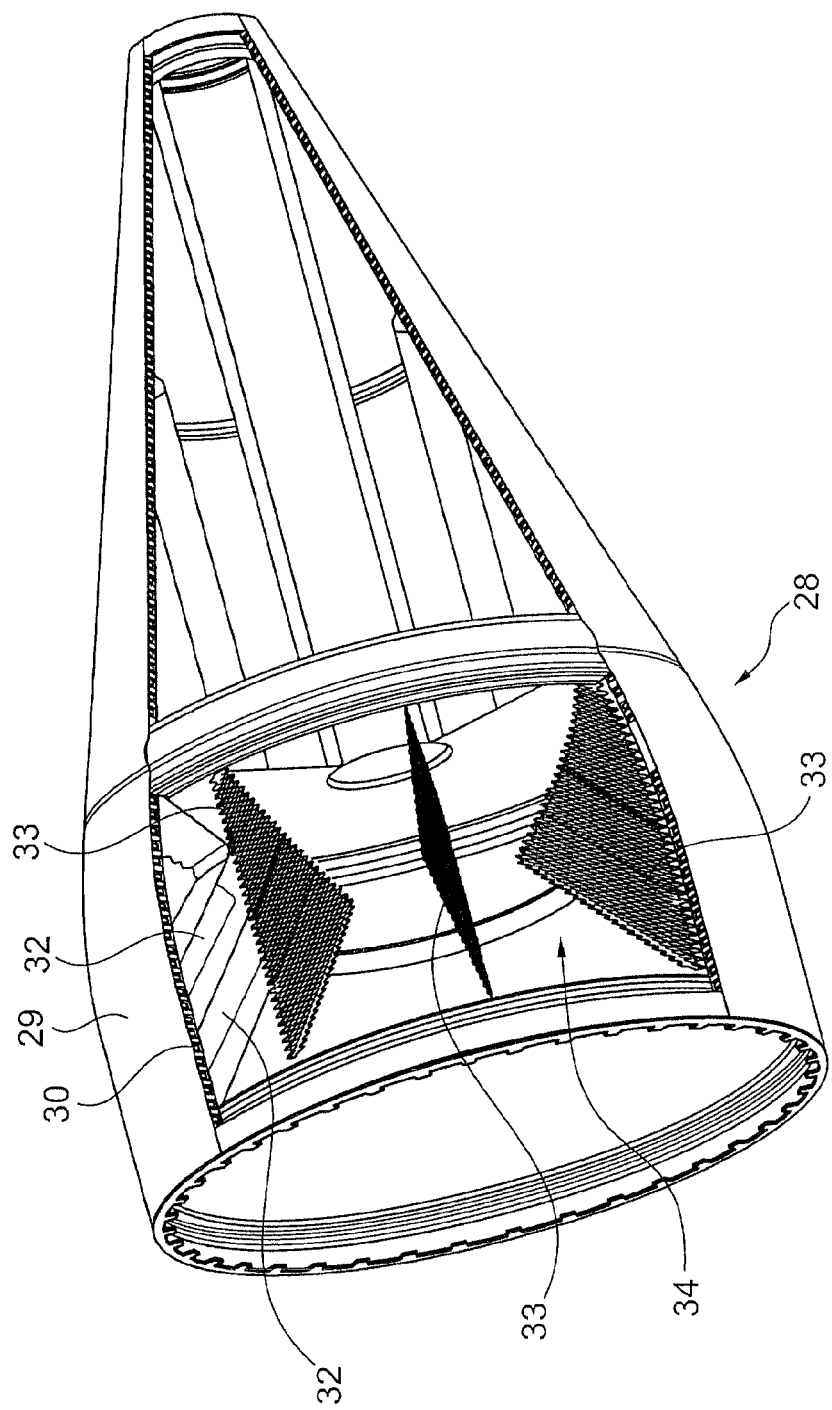
Figure 4:
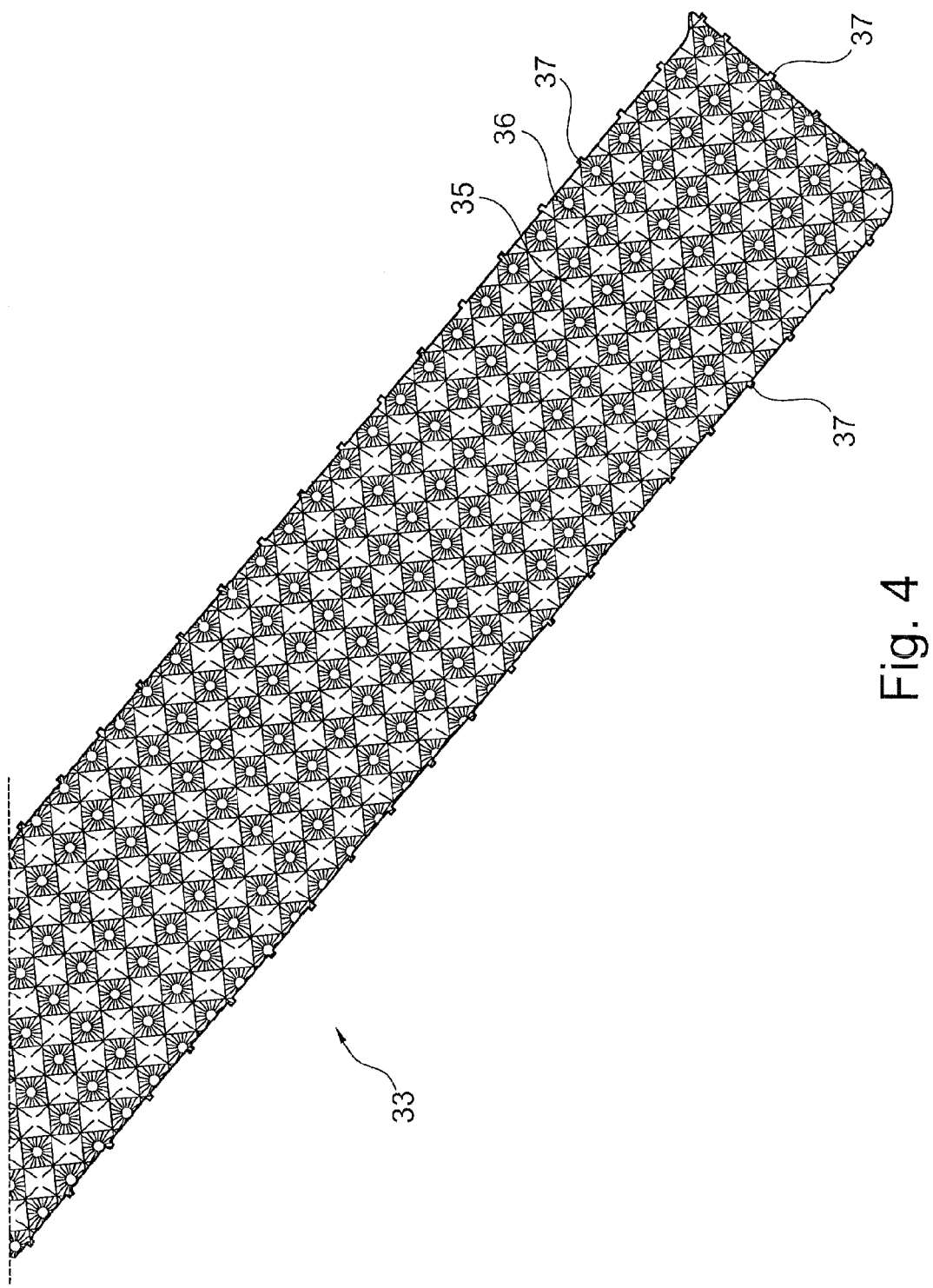
Figure 5:
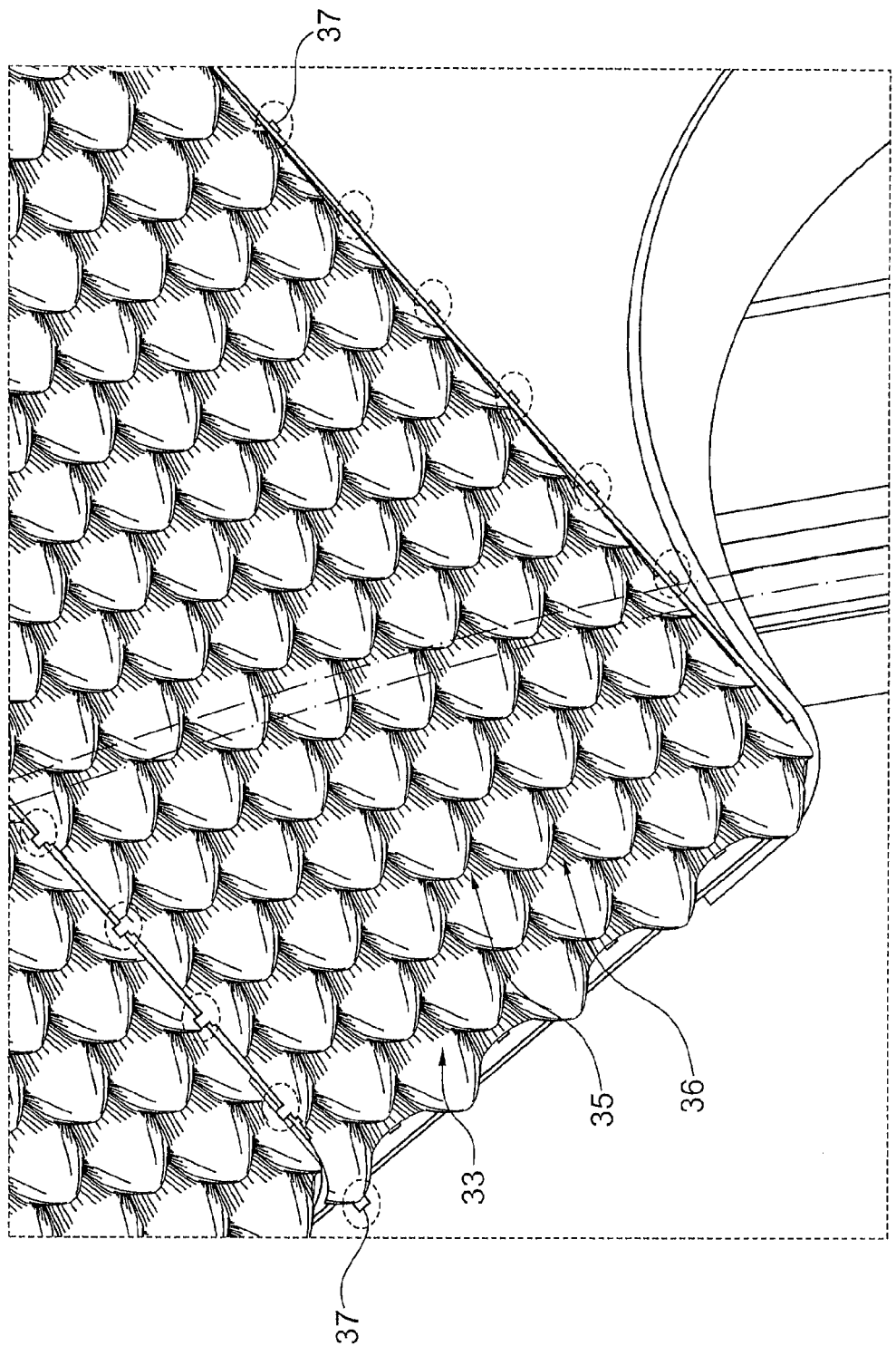
Figure 6:
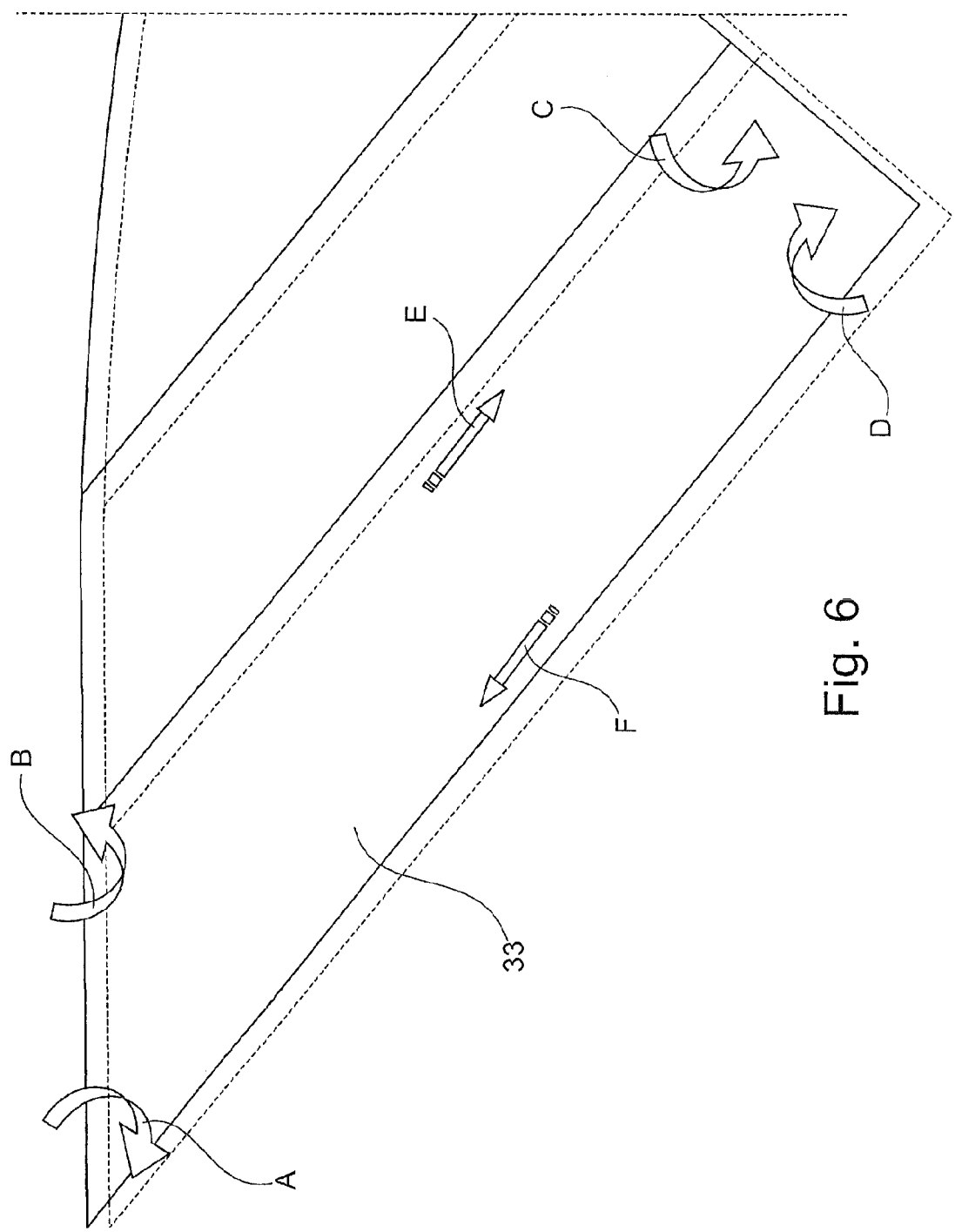

The present invention is more fully described in light of the accompanying drawing showing an exemplary embodiment. In the drawing, FIG. 1 shows a schematic representation of a gas-turbine engine in accordance with the present invention, FIG. 2 shows a simplified axial sectional view of an exhaust cone in accordance with the present invention, FIG. 3 shows a view of the exhaust cone in perspective, partly sectional representation, FIG. 4 shows a partial view of a partition wall in accordance with the present invention or of a plate-type wall element, FIG. 5 shows a further view of the partition wall or of the plate-type wall element in perspective representation, and FIG. 6 shows a simplified representation of the stresses occurring due to thermal effects.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

Reference numeral 28 designates an exhaust cone. This cone is shown in greater detail in FIGS. 2 and 3. The exhaust cone includes an installation area, shown on the left-hand side of FIG. 2, adjoining a turbine outlet, and a substantially conical central area (right-hand area in FIG. 2). The illustration of an end area was dispensed with.

The exhaust cone 28 includes an outer wall 29 provided with a plurality of recesses. A honeycomb-structured layer 30 is arranged on the inside of the outer wall 29 and is adjoined by an inner wall 31 likewise having sound passage recesses.

The left-hand area as per FIG. 2 in particular is provided with several radially circumferential annular chambers 32 inclined relative to the central axis (engine axis) 1 and used in particular for damping of low-frequency sound vibrations. The individual annular chambers 32 are subdivided in the circumferential direction, as shown in FIG. 3, by partition walls 33 (plate-type wall elements) into individual chambers 34 which are thus arranged like segments around the circumference and which form the ring structure of the annular chamber 32.

In accordance with the invention, the partition walls 33 are each designed in the form of a three-dimensional structure which, as shown in FIG. 5 in particular, has raised areas 35 and recessed areas 36. The partition wall 33 is manufactured from a sheetmetal-like material by shaping or similar methods. The raised areas 35 and the recessed areas 36 together form a structure like an eggbox into which eggs can be placed. In the sectional view, the partition wall 33 is wave-shaped or sinusoidal, thus having a pattern of raised areas and recessed areas. A three-dimensional and wavy structure is thus obtained. At those edge areas (rim areas) where the partition wall 33 is to be connected to structural elements of the exhaust cone, fastening straps 37 are provided which project beyond the edges and are used for welded connection.

FIG. 6 shows a representation from which the stresses caused by thermal expansions and contractions are indicated. The dashed lines show here in comparison with the continuous lines the resultant shape changes. The arrow A shows that a reduction in the angle results at this corner. At the adjacent corner (arrow B), there is an increase in the angle. The arrow C at the opposite wall shows a reduction in the angle, while arrow D represents an increase in the angle. The arrows E and F show the stresses applied by shear forces.

It is thus clear that the partition wall (plate-type wall element) in accordance with the invention can be shaped in different ways without forces being introduced as a result which exceed the material strength and would cause component failure.

LIST OF REFERENCE NUMERALS

1 Engine axis/central axis
10 Gas-turbine engine
11 Air inlet
12 Fan rotating inside the casing
13 Intermediate-pressure compressor
14 High-pressure compressor
15 Combustion chambers
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Outer wall
30 Honeycomb-structured layer
31 Inner wall
32 Annular chamber
33 Partition wall/plate-type wall element
34 Chamber
35 Raised area
36 Recessed area
37 Fastening strap

What is claimed is:

1. A gas-turbine exhaust cone comprising:
an outer wall having a plurality of recesses;
a honeycomb-structured layer arranged at the inside of the outer wall and extending along the inside of the outer wall;
an inner wall connected to the honeycomb structure and extending essentially parallel to the outer wall;

at least one annular chamber centered on a central axis and adjoining the inner wall, the inner wall having passage recesses connecting the honeycomb structure to the annular chamber;

at least one partition wall subdividing the annular chamber into a plurality of chambers in a circumferential direction, the partition wall constructed from a sheet material and including a plurality of at least one chosen from raised areas and recessed areas in a uniform arrangement formed by shaping of the sheet material; the at least one chosen from the raised areas and the recessed areas being exposed to the annular chamber.

2. The gas-turbine exhaust cone in accordance with claim 1, wherein the partition wall has a three-dimensional structure with a regular pattern of raised and recessed areas, and is at least one chosen from wave-shaped, sawtooth-shaped, sinusoidal in section, and formed by intersecting wave shapes.

3. The gas-turbine exhaust cone in accordance with claim 2, wherein the partition wall can thermally expand in different directions.

4. The gas-turbine exhaust cone in accordance with claim 3, and further comprising lateral fastening straps provided on at least one side of the partition wall.

5. The gas-turbine exhaust cone in accordance with claim 4, wherein the fastening straps are attached to supporting structures by at least one chosen from spot welding and spot joining.

6. The gas-turbine exhaust cone in accordance with claim 1, wherein the partition wall can thermally expand in different directions.

7. The gas-turbine exhaust cone in accordance with claim 1, and further comprising lateral fastening straps provided on at least one side of the partition wall.

8. The gas-turbine exhaust cone in accordance with claim 7, wherein the fastening straps are attached to supporting structures by at least one chosen from spot welding and spot joining.

9. A gas-turbine exhaust cone, comprising:
an annular wall structure;
an annular chamber formed by the annular wall structure and centered on a central axis;
at least one partition wall subdividing the annular chamber into a plurality of chambers in a circumferential direction, the partition wall constructed from a sheet material and including a plurality of at least one chosen from raised areas and recessed areas in a uniform arrangement formed by shaping of the sheet material; the at least one chosen from the raised areas and the recessed areas being exposed to the annular chamber.

10. The gas-turbine exhaust cone in accordance with claim 9, wherein the partition wall has a three-dimensional structure with a regular pattern of raised and recessed areas, and is at least one chosen from wave-shaped, sawtooth-shaped, sinusoidal in section, and formed by intersecting wave shapes.

11. The gas-turbine exhaust cone in accordance with claim 9, wherein the wall element can thermally expand in different directions.

12. The gas-turbine exhaust cone in accordance with claim 9, and further comprising lateral fastening straps provided on at least one side of the wall element.

13. The gas-turbine exhaust cone in accordance with claim 9, wherein the fastening straps are attached to supporting structures by at least one chosen from spot welding and spot joining.

14. The gas-turbine exhaust cone in accordance with claim 10, wherein the wall element can thermally expand in different directions.

15. The gas-turbine exhaust cone in accordance with claim 14, and further comprising lateral fastening straps provided on at least one side of the wall element.

16. The gas-turbine exhaust cone in accordance with claim 15, wherein the fastening straps are attached to supporting structures by at least one chosen from spot welding and spot joining.

* * * * *